July 15, 1958 K. W. HALLDEN 2,843,202
APPARATUS FOR SYNCHRONIZED INTERMITTENT PERFORMANCE
ON STOCK OF VARIABLE FEED RATE
Filed Jan. 15, 1957 6 Sheets-Sheet 6
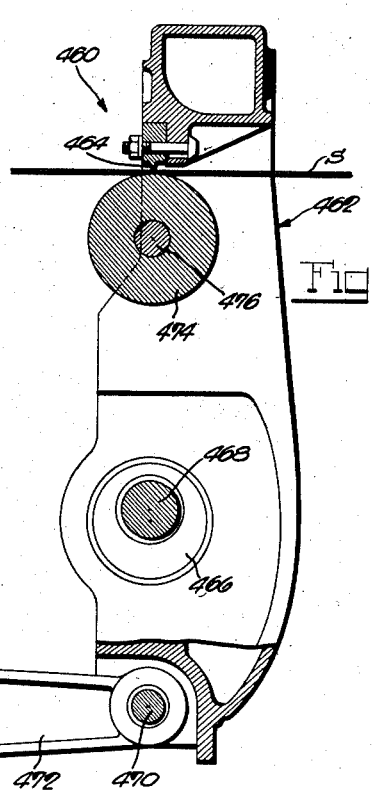
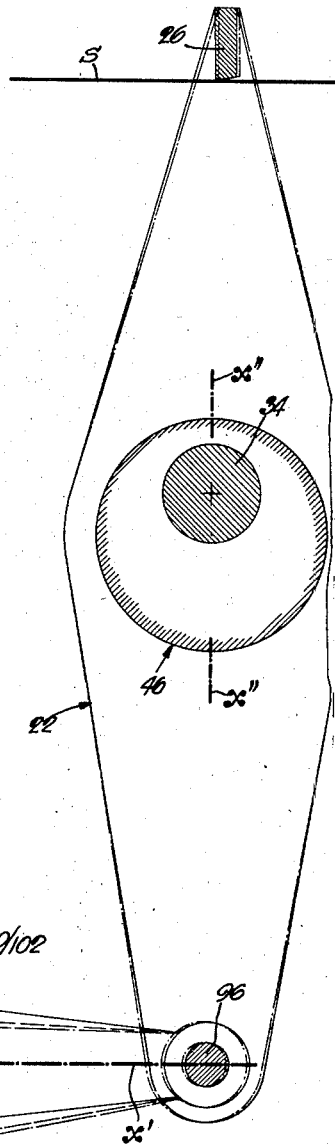
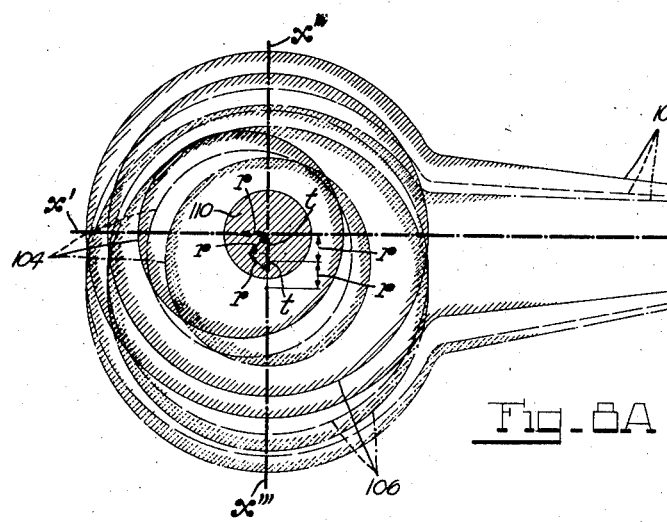
INVENTOR.
Karl W. Hallden
BY
Attorney.

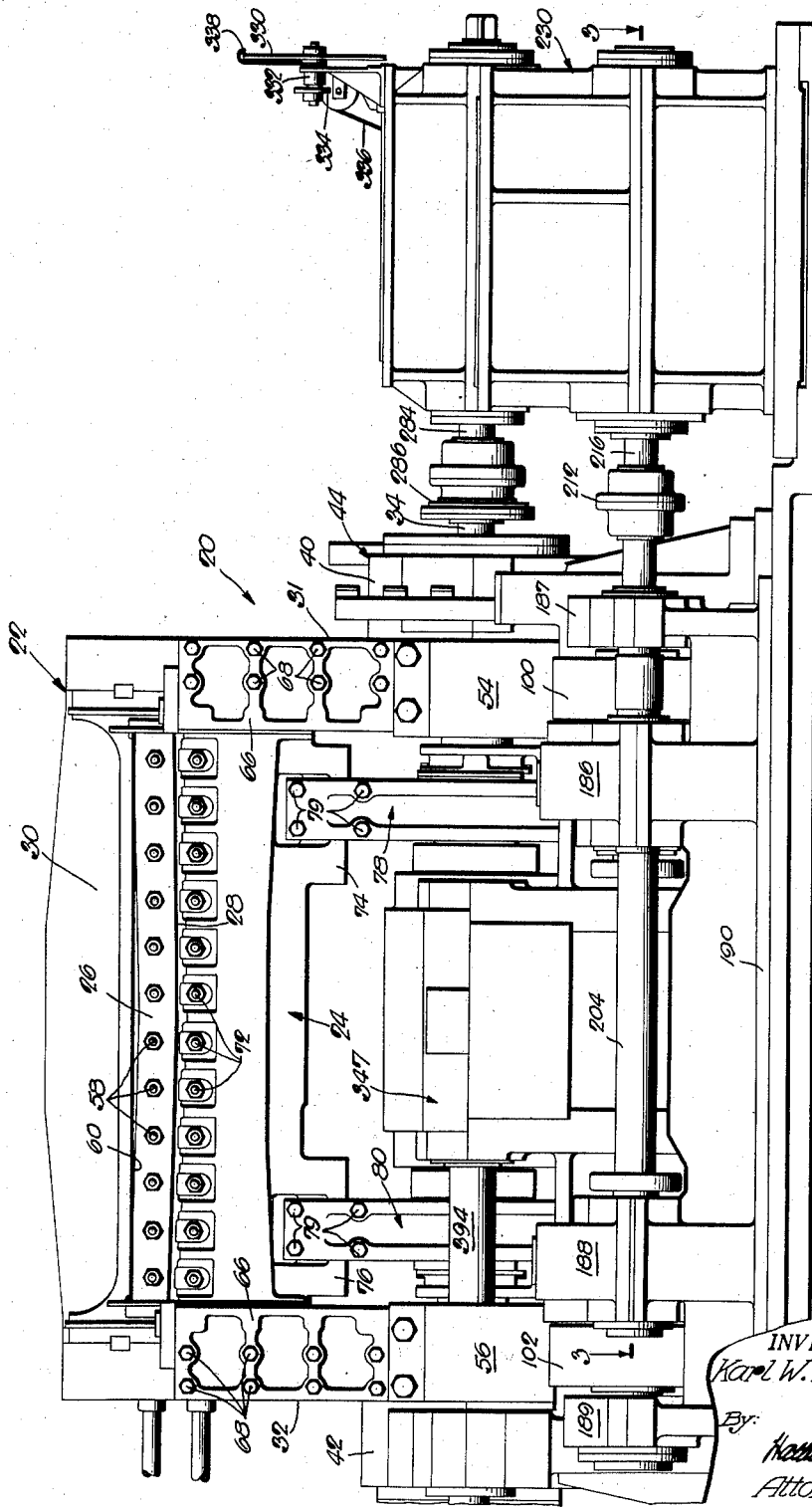

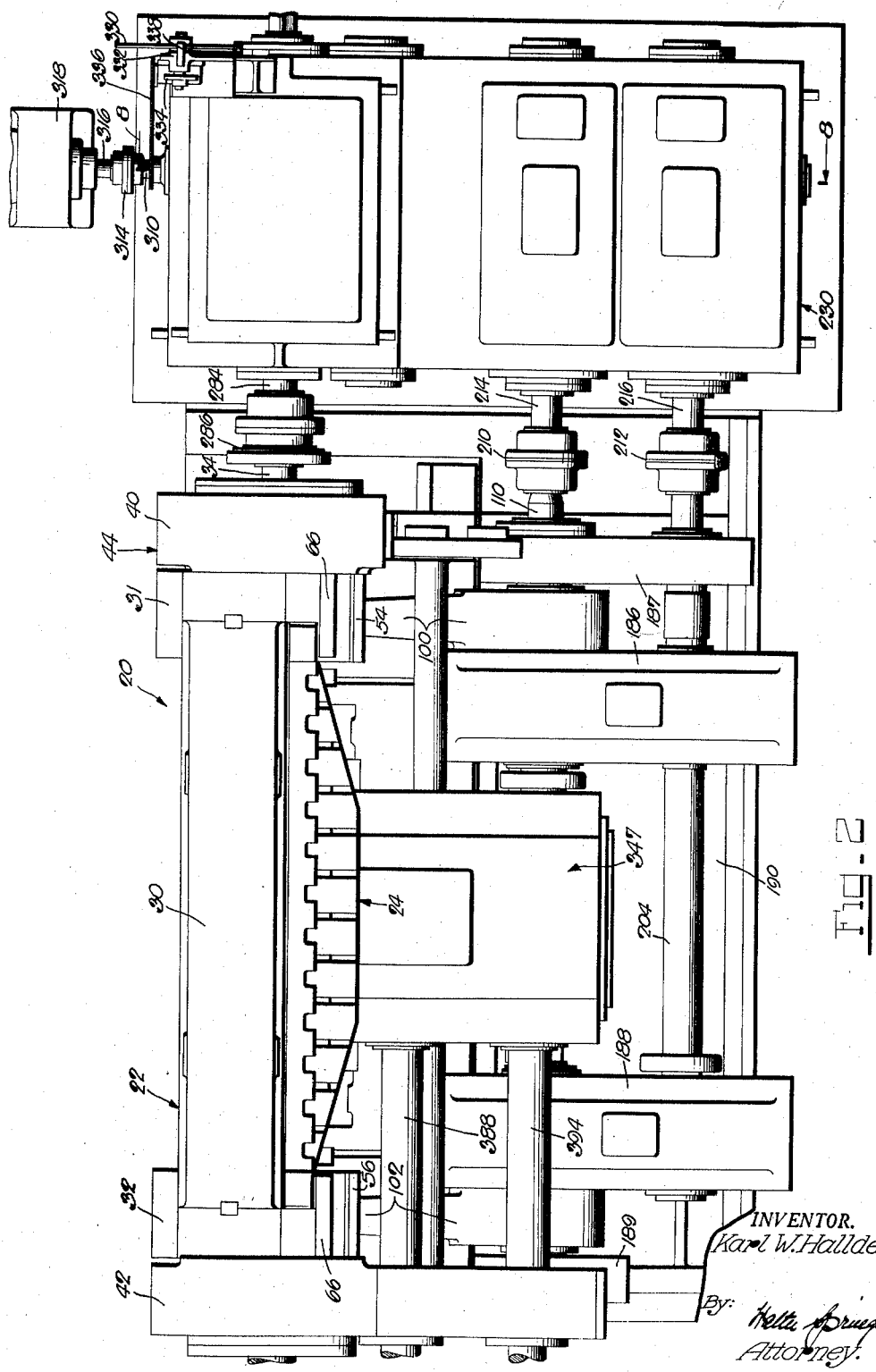

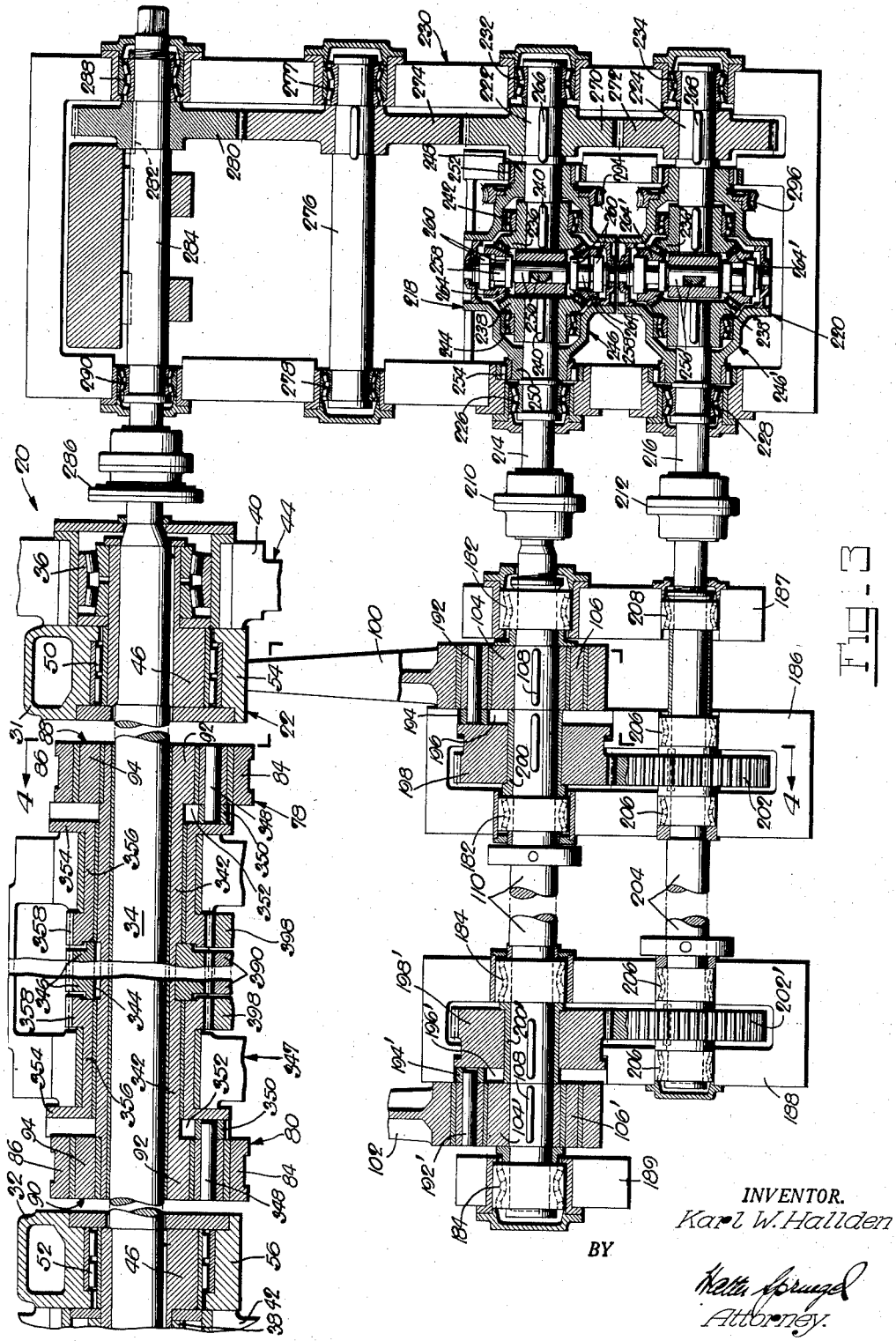

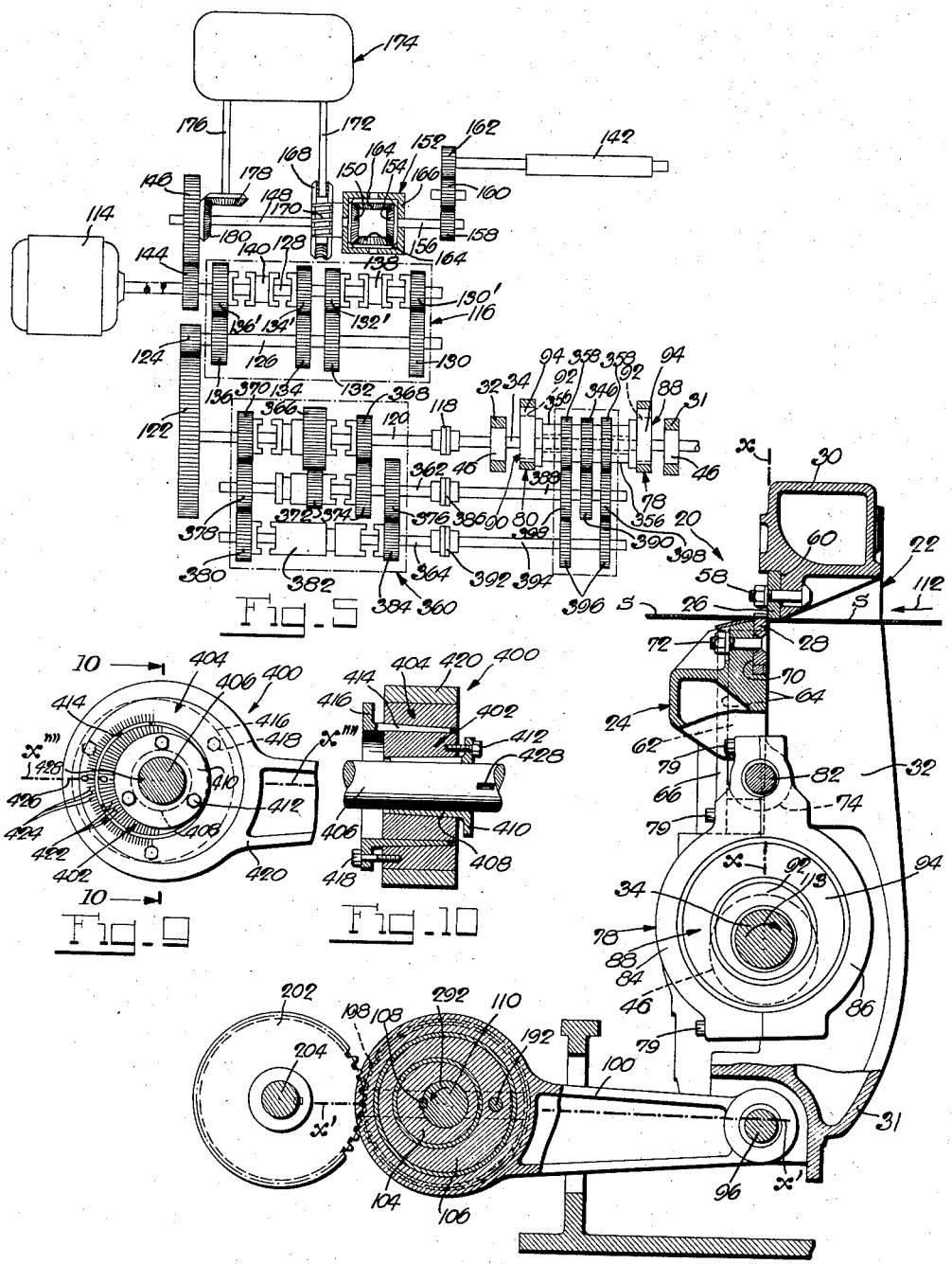

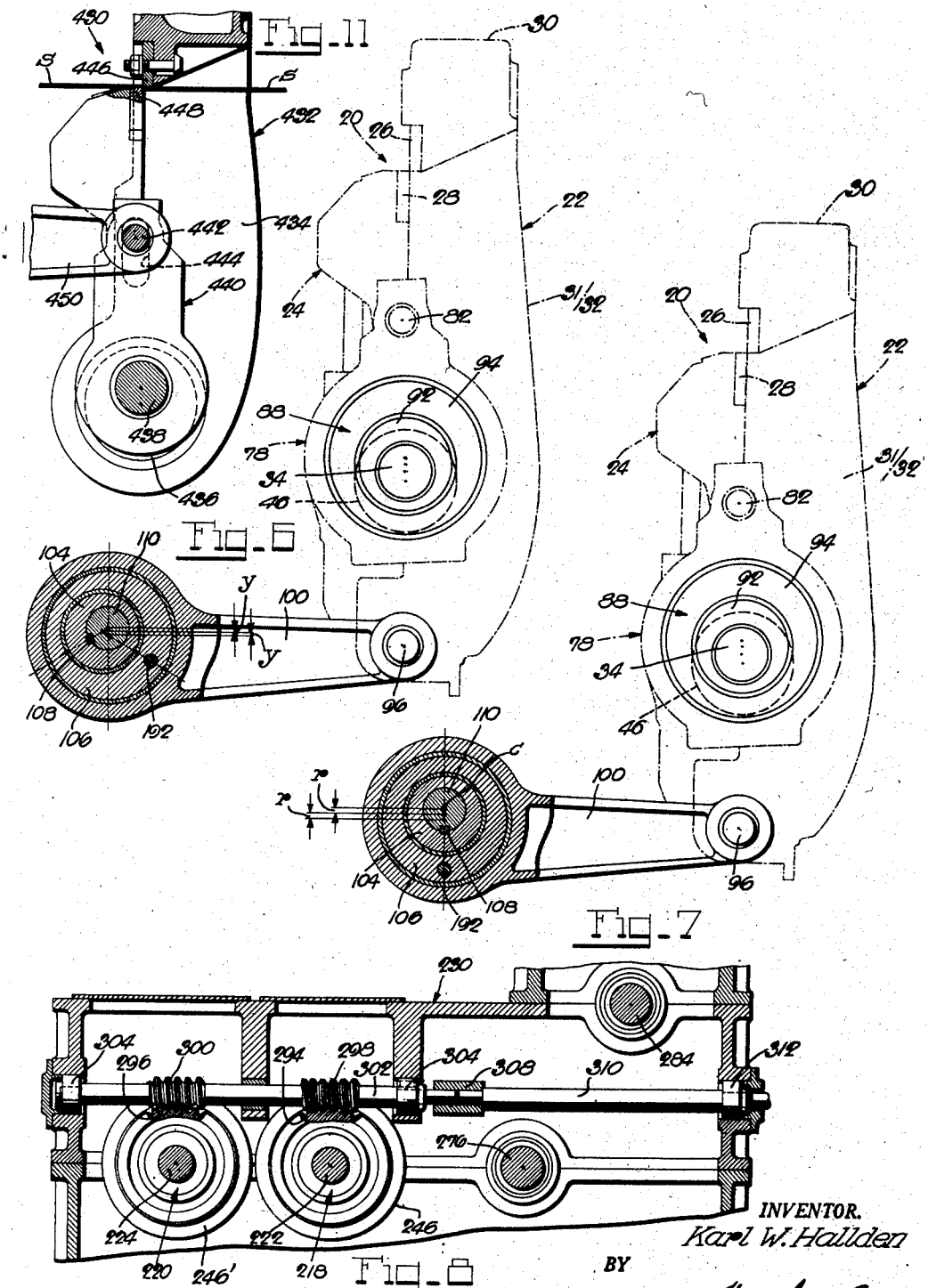

United States Patent Office 2,843,202
Patented July 15, 1958

2,843,202

APPARATUS FOR SYNCHRONIZED INTERMITTENT PERFORMANCE ON STOCK OF VARIABLE FEED RATE

Karl W. Hallden, Thomaston, Conn., assignor to The Hallden Machine Company, Thomaston, Conn., a corporation of Connecticut Application January 15, 1957, Serial No. 634,259

23 Claims. (Cl. 164—49)

This invention relates in general to stock-cutting apparatus, and in particular to apparatus for cutting stock in motion.

The present invention is directed primarily, though not exclusively, to so-called flying shears of which the companion shear blades travel with the stock to-be-cut just prior to and during each severance of the stock by the blades. A representative shear of this flying type is disclosed in my prior patent, No. 2,642,937, dated June 23, 1953. In this prior shear, the companion blades are carried by a shear frame and a shear gate, respectively, of which the latter is guided on the former for movement of its blade into and from shearing relation with the other blade, the frame and gate being operatively connected with power-driven coaxial eccentrics, respectively, which cooperate to bring the blades into shearing relation with each other at recurring intervals. This prior shear has also provisions for imparting to the shear frame and shear gate a primary oscillation which is partly instrumental in achieving movement of the blades thereon in synchronism with the stock in motion at the time of each stock-cutting action of the blades. To this end, the shear frame is pivoted, remotely from its operating eccentric, for floating movement in the cutting direction of the blades substantially at right angles to the stock, so that the operating eccentric imparts to the shear frame a compound bodily and oscillatory motion of which the bodily motion is in the cutting direction of the blades and the oscillatory motion is about the floating pivot. It is this primary oscillation of the shear frame, which is participated in by the shear gate, that is partly instrumental in achieving, in a manner described hereinafter, movement of the blades, at each shearing action thereof, in synchronism with the stock, with the result that the stock will neither buckle or be otherwise appreciably stressed, nor be marred, at the time of cut, and the shear blades will remain sharp for a long time.

This prior shear has also provisions for cutting certain unit lengths of stock which differ from each other by certain, and in this instance equal, increments, and for additionally cutting lengths of stock which may vary infinitely between the smallest and largest unit lengths of stock. To this end, the operating eccentrics of the shear frame and gate are driven by the output shaft of a change-gear unit with different sets of step gears, while the stock feed may be operated at uniform speed, with the result that different unit lengths of cut are achieved on selecting different sets of the step gears for the drive of the operating eccentrics. To the same end also, the operating speed of the stock feed may infinitely be varied, in this instance from at least a minimum at which the aforementioned unit lengths of cut are achieved by the use of the different sets of step gears of the change-gear unit alone, to at least a maximum at which the next larger unit lengths of cut are achieved on using the same sets of step gears of the change-gear unit. Accordingly, there is added, in this instance, to the aforementioned unit lengths of cut another unit length of cut, namely the maximum possible unit length, which is achieved on using that set of step gears of the change-gear unit which achieves the largest unit length of cut, and running the stock feed at the aforementioned maximum speed. Hence, the shear is capable of cutting stock in lengths which are infinitely variable at least within the range between the aforementioned smallest unit length and the maximum possible unit length, hereinafter referred to as "unit-length range."

This prior shear has also provisions for achieving the aforementioned movement of the blades, at the time of each shearing action thereof, in synchronism with the stock for cuts anywhere within the aforementioned unit-length range. To this end, there is turnable with the operating eccentric of the shear frame a crank disc with a diametrically adjustable crank pin thereon which is pivotally connected with a rack that is in permanent mesh with a gear with which is turnable a "synchronizing" eccentric that is operatively connected by a follower strap with the shear frame at the aforementioned pivot which, as stated before, is floatable by virtue of the rotary freedom of the follower strap on the synchronizing eccentric. Thus, on adjusting the crank pin to dead-center position, in which its axis coincides with the axis of the crank disc, no motion is imparted to the synchronizing eccentric, meaning that the synchronization of the shear frame and gate with the fed stock at the time of each cut is undertaken solely by the operating eccentric of the shear frame. This dead-center setting of the crank pin may, for instance, be undertaken for cutting stock of a length substantially midway within the aforementioned unit-length range. However, as the shear is set for cutting smaller or larger lengths of stock within the unit-length range, the oscillatory motion of the shear frame and gate at the time of cut is synchronized with the stock speed by appropriate adjustment of the crank pin on the crank disc away from the axis of the latter. In doing so, the synchronizing eccentric is oscillated during each turn of the operating eccentric of the shear frame and will impart to the latter, through the follower strap connection therewith, a superimposed secondary oscillation which takes place about its operating eccentric as a fulcrum and which is of such amplitude as to modify the primary oscillation of the shear frame imparted to it by its operating eccentric so that its resultant oscillatory speed, at the time of cut, is equal to and, hence, synchronous with the stock speed. In this connection, the amplitude of the secondary oscillation of the shear frame, and hence the secondary synchronizing speed of the latter at the time of each cut, are determined by the spacing of the crank pin from the center axis of the crank disc, while the additive or subtractive effect of the secondary oscillation of the shear frame upon its primary oscillation is determined by the side to which the crank pin is adjusted away from the center axis of the crank disc.

While the synchronizing provisions for the shear frame and gate in my prior shear have been satisfactory for a long time, they are hardly conducive to increasing the output capacity of this or similar shears to meet ever increasing demands of the industry in this respect. This is, of course, due to the oscillatory and/or reciprocatory motions of all of the parts of these synchronizing provisions, except of the crank disc, which motions are notoriously unsuited for high-speed operation, for the constantly reversing stresses in the relatively large oscillating and reciprocating masses involved, wear of their bearings and of the meshed gear teeth, and vibrational disturbances, increase rapidly and soon become excessive on even moderate speed-up of their operation. This is true despite the fact that the constantly recurring reversals of these parts are in accordance with a harmonic motion originating at the crank drive of the rack, for acceleration and deceleration of these parts become nevertheless prohibitive at even a moderate speed-up of their operation. Moreover, the imperative compound oscillatory and reciprocatory motions of the shear frame and gate, which are typical of flying shears of this type, induce vibrational forces which, while in themselves tolerable and safely controllable at even considerably increased output capacity of these shears, are vastly augmented by vibrational forces induced by the oscillating and reciprocating masses of the synchronizing provisions, with the result that the overall vibrational forces become so great as alone to prohibit even moderate speed-up of the operation of these shears.

These prior synchronizing provisions are also a prime obstacle to achieving the desirable quick, and also facilitated, adaptability of this or similar shears to cutting stock of different desired lengths. This is primarily due to the fact that adjustment of the crank pin on the crank disc to achieve shear synchronization for each change in stock length to be cut has to be undertaken while the shear is at rest. Thus, it requires not only considerable time, but also considerable skill and good judgment on the part of an operator, to undertake proper adjustment of the crank pin, for he has to rely solely on graduated scale provisions on the crank disc for the adjustment of the crank pin in accordance with a desired length of cut of the stock, and then test the accuracy of the adjustment on a trial operation of the shear which will frequently indicate renewed stoppage of the latter for further corrective adjustment of the crank pin. Moreover, the very nature of this adjustment procedure of the crank pin is anything but conducive to achieve, without exceptional skill and prolonged trials, that accuracy of synchronization of the shear which alone will cause the least, if any, interference between the stock and shear blades at the time of cut and subject the shear, including the cutting blades thereof, to the least operational stresses and wear.

It is among the important objects of the present invention to provide a shear of this type with synchronization provisions in which oscillatory and reciprocatory motions are to all practical intents and purposes eliminated and continuous rotary motion of the parts thereof is, instead, resorted to for the synchronization of the shear, thereby to permit any desired increase in the operating speed, and hence output capacity, of the shear without incurring either undue wear of and undue stresses in the parts thereof, or undue vibrational disturbances.

It is another object of the present invention to provide a shear of this type with synchronization provisions of which a synchronizing eccentric device, that is operatively connected with the shear frame by a follower strap, is driven by a gear train from the operating eccentric of the shear frame at a one-to-one ratio, and is angularly adjustable relative thereto for synchronization of the shear in accordance with different lengths of cut, thereby achieving the aforementioned performance of the synchronization provisions by continuous rotary motion of its parts, save harmless compound harmonic oscillation and reciprocation of the relatively small mass of the follower strap as caused by continuous rotation of the synchronizing eccentric device.

It is a further important object of the present invention to provide a shear of this type with synchronization provisions of which the aforementioned synchronizing eccentric device is formed by two cooperating eccentrics of which one turns on the other, and both have identical radii and are angularly adjustable relative to each other and to their driving gear train, thereby to permit relative angular adjustment of these eccentrics into dead-center position, i. e., in diametrical radius opposition to each other, for imparting no secondary oscillations to the shear frame, as well as to permit their relative angular adjustment for imparting to the shear frame secondary oscillations of variable amplitude which, moreover, may be additive to or subtractive from the primary oscillations of the shear frame imparted to it by its operating eccentric, whichever is required for a particular synchronization.

Another important object of the present invention is to provide a shear of this type with synchronization provisions which permit relative angular adjustment of the aforementioned cooperating synchronizing eccentrics for imparting to the shear frame secondary oscillations which may be of any amplitude within the radius capacity of these eccentrics and which may be either additive to or subtractive from the primary oscillations of the shear frame from its operating eccentric, without incurring, to all practical intents and purposes and regardless of any length of cut to which the shear may be adjusted, deviation of the shear frame and gate from a most favorable angular position, at the time of any cut, in which the shear blades extend in planes substantially at right angles to the guided stock being fed. To this end, the cooperating synchronizing eccentrics may, with the aid of, or through, suitable devices, be relatively adjusted so that they will, in their aforementioned dead-center position, extend with their diametrically opposed radii in a plane in which lies the pivot connection of the follower strap with the shear frame when the blades substantially complete their shear strokes, and these eccentrics may further be adjusted, from their dead-center position, equal angular amounts jointly to either side of this plane. In thus providing for relative adjustment of the cooperating synchronizing eccentrics, the momentary angular position of the effective or resulting overall radius of these eccentrics in any of their relative adjustments at the time of cut by the blades coincides with a plane which extends at right angles to the aforementioned plane in which these eccentrics extend with their diametrically opposed radii when in their dead-center position, with the result that any deviation of the shear frame from its aforementioned most favorable cutting position at the time of any cut of any length is quite negligible and even unnoticeable. Deviation of the shear frame from its aforementioned most favorable cutting position at the time of any cut of any length becomes still more negligible, since the eccentric follower strap is, for this and other advantageous considerations, made of substantial length.

A further important object of the present invention is to provide a shear of this type with synchronizing provisions which permit highly advantageous, quick and facile, as well as highly accurate, synchronization of the shear to any length of cut within the aforementioned unit-length range, while the shear is running. To this end, the aforementioned driving gear train from the operating eccentric of the shear frame is operatively connected with the cooperating synchronizing eccentrics through intermediation of differential gear units, respectively, and so that both synchronizing eccentrics are driven in the same direction and at the same speed, and the normally arrested arms or housings of the differential gear units are so coordinated and coupled to each other for simultaneous rotary adjustment, while the shear is at rest or in operation, as to achieve the aforementioned relative angular adjustments of these synchronizing eccentrics, including their relative adjustment into dead-center position, on simultaneous adjustment of the arms of the differential gear units.

It is another important object of the present invention to provide a shear of this type with synchronizing provisions of which the coupling between the arms of the aforementioned differential gear units for their simultaneous adjustment is in the form of worm gears which are turnable with these arms, respectively, and worms which are carried on a common shaft and are in permanent mesh with the respective worm gears, with the common shaft turnable in either direction, preferably by power, while the shear is at rest or in operation, thereby also achieving normal arrest of the arms of the differential gear units in any of their angularly adjusted positions by the self-locking action of the worms, as well as preventing overly fast and possibly damaging response of the shear synchronization to the power drive of the common worm shaft.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a front elevation of a shear embodying the present invention;

Fig. 2 is a top view of the shear;

Fig. 3 is an enlarged fragmentary section through the shear, taken substantially on the line 3—3 of Fig. 1;

Fig. 4 is a fragmentary section through the shear, taken substantially on the line 4—4 of Fig. 3;

Fig. 5 is a diagrammatic view of certain prominent drives of the shear;

Figs. 6 and 7 are part-sectional and part-elevational views of part of a certain synchronizing device of the shear in different operating positions, however, with part of the shear shown in phantom outline;

Fig. 8 is a fragmentary section through the shear, taken substantially on the line 8—8 of Fig. 2;

Fig. 8A is a diagrammatic view of part of the synchronizing device of the shear in different settings;

Fig. 9 is a fragmentary elevational view of a modified part of the synchronizing device of the shear;

Fig. 10 is a fragmentary section taken on the line 10—10 of Fig. 9; and

Figs. 11 and 12 are apparatus embodying the present invention in different modified forms, respectively.

Referring to the drawings, and more particularly to Figs. 1 to 4 thereof, the reference numeral 20 designates a shear having a frame 22 and a gate 24 which, in the present instance, carry companion shear blades 26 and 28, respectively (Fig. 4). The frame 22, being presently of inverted U-shape and having a cross-head 30 and spaced depending legs 31 and 32, is carried by a main drive shaft 34 which is journalled at its opposite ends in antifriction bearings 36 and 38 in uprights 40 and 42, respectively, of a base frame 44 (Figs. 1, 2 and 3). More particularly, the shear frame 22 is turnable on spaced operating eccentrics 46 of identical radii on the main shaft 34, presently through intermediation of antifriction bearings 50 and 52 which are seated in the frame legs 31 and 32 and complementary bearing caps 54 and 56 thereon, respectively (Figs. 4, 3 and 1). The shear frame 22 is thus oscillatable about its operating eccentrics 46 on the main shaft 34. The upper shear blade 26 is, by bolts 58, mounted in a longitudinal recess 60 in the cross-head 30 of the shear frame 22 (Figs. 1 and 4).

The shear gate 24 is guided on the shear frame 22 for movement of its blade 28 into and from shearing relation with the companion blade 26 and stock s between them (Fig. 4). To this end, the shear gate 24 is provided at its opposite ends with guide ribs 62 (Fig. 4) which are received in guideways 64 in the opposite frame legs 31 and 32 and retained therein by gib plates 66 which are bolted to the latter as at 68 (see also Fig. 1). More particularly, the shear gate 24 is guided on the shear frame 22 for movement in the plane x—x (Fig. 4) in which the upper and lower shear blades 26 and 28 lie with their adjacent faces and in which they reciprocate into and from shearing relation with each other and with the stock s between them. The lower shear blade 28 is presently seated in a longitudinal recess 70 in back of the shear gate 24 (Fig. 4), and held therein by bolts 72 (see also Fig. 1). The shear gate 24 is provided with depending forked lugs 74 and 76 with which eccentric follower straps 78 and 80, respectively, are operatively connected through intermediation of pivots 82 (Figs. 1 and 4). The follower straps 78 and 80, each of which is conveniently formed by complementary sections 84 and 86 that are bolted together at 79 (Fig. 4), are turnable on spaced operating eccentric devices 88 and 90 of equal radii, respectively, each of which comprises an inner eccentric 92 and an outer eccentric 94 (see also Fig. 3) which may, for present purposes, be considered to be locked to each other and to the main shaft 34 in radius complementary relation with each other and in diametrical radius opposition to the frame-operating eccentrics 46 as shown in Fig. 4. Thus, the radii or throws of the frame-operating eccentrics 46 and of the gate-operating eccentric devices 88 and 90 are such that the upper and lower blades 26 and 28 will, on the drive of the main shaft 34 relative to the shear frame 22 and shear gate 24, move into shearing relation with each other and with the stock s between them on recurring passages of these eccentrics and eccentric devices through the respective angular positions shown in Fig. 4.

The instant shear 20 is of the so-called "flying" type, meaning that the blades 26 and 28 on the shear frame and gate 22 and 24 move, at the times of their shear actions on the stock, in synchronism with the stock while the same is being continuously fed in a guided path. To this end, the shear frame 22 is floatingly pivoted remotely from its operating eccentrics 46. This is achieved, in the present instance, by pivot connections 96 between the lower ends of the shear frame legs 31 and 32 and straps 100 and 102 in follower relation with pairs of eccentrics 104—106 and 104'—106', respectively, of which the inner eccentrics 104 and 104' are keyed at 108 to a countershaft 110 and the outer eccentrics 106 and 106' are turnable on the inner eccentrics 104 and 104', respectively (Figs. 3 and 4). Moreover, the eccentrics of each pair have equal radii, and the outer eccentrics are, in the exemplary showing of Fig. 4, angularly adjusted, in a manner to be described, on the respective inner eccentrics in diametrical radius opposition thereto, so that the eccentrics of both pairs act, in their present exemplary relative angular adjustments, like discs which are centrally mounted on the shaft 110 and, hence, impart neither oscillatory motion nor reciprocatory motion to the respective follower straps 100 and 102 when the shaft 110 is driven in a manner also described hereinafter. Thus, the frame pivots 96 are floatable, as previously stated, by virtue of the rotary freedom of the follower straps 100 and 102 on the peripheries of the respective outer eccentrics 106 and 106' on the shaft 110. Accordingly, the operating eccentrics 46 will, on the drive of the main shaft 34, impart to the shear frame 22 compound bodily and oscillatory motions of which the bodily motion is in the shearing direction of the blades 26 and 28, and the oscillatory motion, which is participated in by the shear gate 24, takes place about the floating pivots 96, as will be readily understood. Of course, with the exemplary relative adjustment of the eccentric pairs 104, 106 and 104', 106' in dead-center disposition (Fig. 4) in which the eccentrics of each pair are in diametrical radius opposition to each other and impart neither oscillatory nor reciprocatory motions to the follower straps 100 and 102, as described, the synchronization of the blades 26 and 28 with the fed stock at the times of their shear actions on the latter is undertaken solely by the operating eccentrics 46 of the shear frame 22. Thus, with the pairs of eccentrics 104, 106 and 104', 106' in their dead-center dispositions, and assuming that the stock is fed in the direction of the arrow 112 and the main shaft 34 is driven clockwise in the direction of the arrow 113 (Fig. 4), it follows that the rate of feed of the stock must be equal to the momentary oscillatory speed of the shear frame 22 and shear gate 24, in the feed direction of the stock and at the cutting edges of the respective blades 26 and 28, every time the latter are in shearing relation with each other and with the fed stock, in order that the blades may move in synchronism with the stock at their recurring shearing actions thereon for cutting stock of one certain "standard" length.

The present shear 20 is, like my aforementioned prior shear, capable of cutting different unit lengths of stock by varying the speed of the main shaft 34 relative to the rate of feed of the stock s. To this end, the main shaft 34 is driven from a prime mover 114, presently a motor of preferably variable-speed type, through intermediation of a change-gear unit 116 (Fig. 5). The main shaft 34 is presently coupled at 118 to another shaft 120 which is suitably journalled and carries a gear 122 that is in mesh with another gear 124 on the output shaft 126 of the change-gear unit 116, the input shaft 128 of which is operatively connected with the motor 114. Keyed or otherwise secured to the output shaft 126 are gears 130, 132, 134 and 136 which are in permanent mesh with companion gears 130', 132', 134' and 136', respectively, that are loose on the input shaft 128. However, any one of the gears 130', 132', 134' or 136' may be drivingly connected with the input shaft 128 on sliding the appropriate splined coupling member 138 or 140 on the input shaft 128 into engagement with a companion coupling member on the respective gear. The ratios of the gear pairs 130—130', 132—132', 134—134' and 136—136' are different, and are preferably so selected that the lengths of cut, i. e., unit lengths, achieved by the shear on using the various gear pairs for the drive of the main shaft 34 and on feeding the stock at a certain uniform rate, will vary from each other by equal increments. Thus, at this certain rate of feed of the stock s and at a certain normal operating speed of the motor 114, it may be assumed, by way of example, that the unit lengths of cut achieved through the use of the gear pairs 130—130', 132—132', 134—134' and 136—136' be 30, 24, 18 and 12 inches, respectively, which in this example vary from each other by equal increments of 6 inches.

Provisions are also made to achieve stock cuts of lengths which may vary infinitely between the aforementioned unit lengths of cut. To this end, the feeding device for the stock, presently shown diagrammatically as companion feed rolls 142 in Fig. 5, is driven at infinitely variable speed from the motor 114. Thus, the motor shaft carries a gear 144 in mesh with another gear 146 on a shaft 148 which carries a sun gear 150 of a differential gear unit 152 that has another sun gear 154 on a shaft 156 which, through intermediation of gears 158, 160 and 162 drives the stock feed 142. Interposed between and meshing with the sun gears 150 and 154 are planetary gears 164 on an arm or housing 166 which turns freely on the axially aligned shafts 148 and 156 and carries a worm gear 168 which is in mesh with a worm 170 on the output shaft 172 of a transmission 174 of infinitely variable output speed, within limits. The input shaft 176 of this transmission 174 is, through intermediation of bevel gears 178 and 180, drivingly connected with the shaft 148. The transmission 174 is a commercial device known as a "PIV" made by the Link Belt Company of Philadelphia, Pennsylvania, and comprises a sprocket chain arranged in driving relationship with two pairs of conical sprocket wheels (neither shown) which are splined to the shafts 172 and 176, respectively, and axially relatively adjustable thereon for changing the speed of the output shaft 172 relative to the speed of the input shaft 176. The details and the exact mode of operation of the transmission 174 are more fully described in my prior Patent No. 2,201,581, dated May 21, 1940, and, hence, require no further description here.

The capacity of the transmission 174 is such that its operating range is at least adequate to achieve the necessary variations in the rate of stock feed to provide for infinite variations of the lengths of cut between any successive ones of the aforementioned unit lengths of cut. Thus, on using, for example, the gear pair 136, 136' of the change-gear unit 116 for the drive of the main shaft 34, the transmission 174 may be adjusted or set for its maximum, or near maximum, effect on the differential gear unit 152 so as to achieve the minimum or aforementioned certain rate of stock feed at which stock will be cut at the exemplary minimum unit lengths of 12 inches. On continued use of the same gear pair 136, 136' of the change-gear unit 116 for the drive of the main shaft 34, the transmission 174 may be adjusted or set for its minimum, or near minimum, effect on the differential gear unit 152 to achieve a maximum rate of stock feed at which stock will be cut at the exemplary next larger unit lengths of 20 inches. Of course, the transmission 174 may be adjusted for any effect on the differential gear unit 152 which may vary infinitely between its aforementioned minimum and maximum effects thereon, with resulting cuts of stock that may vary infinitely between the exemplary unit lengths of 12 to 20 inches. The second smallest exemplary unit length of cut of 20 inches may, of course, be also achieved without adjusting the transmission 174 from its setting of maximum, or near maximum, effect on the differential gear unit 152, by merely using the next pair of companion gears 134, 134' of the change-gear unit 116 for the drive of the main shaft 34, as will be readily understood. Let it now be supposed that stock is to be cut in lengths of 27 inches, for example. To achieve this, the gear pair 132, 132' of the change-gear unit 116 is used for the drive of the main shaft 34. As already mentioned, this gear pair 132, 132' will produce the third largest exemplary unit length of cut of 24 inches if the stock feed is at its minimum rate. Hence, in order to increase the length of cut to the desired 27 inches, the transmission 174 is adjusted to increase the rate of feed of the stock so that stock lengths of exactly 27 inches pass the shear blades 26, 28 between their regularly recurring cutting actions on the stock. Finally, by using the gear pair 130, 130' of the change-gear unit 116 for the drive of the main shaft 34, and feeding the stock at minimum rate, the aforementioned exemplary largest unit length of cut of 30 inches is achieved. However, on using the same gear pair 130, 130' for the drive of the main shaft 34 and feeding the stock at its maximum rate on adjustment of the transmission 174, an additional exemplary maximum unit length of cut of 36 inches may be achieved. Hence, on proper selection of the gear pairs of the change-gear unit 116 for the drive of the main shaft 34 and suitable adjustment of the transmission 174, stock will be cut in lengths which may vary infinitely between the aforementioned minimum and maximum unit lengths of cut, hereinafter referred to as "unit-length range" which in the described example extends from 12 inches to 36 inches.

The need for synchronizing the motion of the shear blades 26, 28 with the stock being fed at the times of their shearing actions thereon for cutting stock lengths anywhere within the aforementioned unit-length range becomes immediately apparent, for it is quite evident that the oscillatory motions imparted to the shear frame 22 and shear gate 24 by the frame-operating eccentrics 46 alone cannot possibly bring about synchronization of the shear blades with the fed stock throughout this unit-length range. In order to achieve synchronization of the motion of the shear blades 26, 28 with the fed stock at the times of their shearing actions thereon, an adjustment of the shear for cutting stock of any length within the unit-length range, secondary oscillations are superimposed upon the primary oscillations of the shear frame 22 imparted to the latter by its operating eccentrics 46. These secondary oscillations of requisite amplitudes are imparted to the shear frame 22 by the eccentric pairs 104, 106 and 104', 106' through intermediation of the respective follower straps 100 and 102 (Figs. 3 and 4). The "synchronizing" eccentrics of these pairs are angularly adjustable relative to each other and to the frame-operating eccentrics 46 on the main shaft 34 and are, moreover, driven in any of their relative adjusted dispositions from the main shaft 34 at a one-to-one ratio, as described hereinafter.

The countershaft 110, on which the inner synchronizing eccentrics 104 and 104' are keyed as described (Figs. 3 and 4), is presently journalled in antifriction bearings 182 and 184 in spaced housings 186 and 188 and uprights 187 and 189 on a common base 190 in front of the shear frame 22 and gate 24 (see also Figs. 1 and 2). Turnable on the inner synchronizing eccentrics 104 and 104' are their outer companion synchronizing eccentrics 106 and 106' (Fig. 3) which carry crank pins 192 and 192' with sliding blocks 194 and 194', respectively, that are received in radial slots 196 and 196' in the adjacent end faces of gears 198 and 198', respectively, which presently are freely turnable on sleeves 200 and 200', respectively, on the countershaft 110. The gears 198 and 198', which are of the same pitch diameter, are in permanent mesh with identical gears 202 and 202', respectively, of the same pitch diameters on another countershaft 204 which presently is journalled in antifriction bearings 206 and 208 in the housings 186, 188 and the upright 187, respectively. The countershafts 110 and 204 are coupled at 210 and 212 to shafts 214 and 216, respectively, which through differential gear units 218 and 220 are drivingly connected with axially aligned shafts 222 and 224, respectively. The shafts 214 and 216 are presently journalled in antifriction bearings 226 and 228, respectively, in another housing 230 on the side of the shear frame 22 and gate 24 (see also Figs. 1 and 2). The shafts 222 and 224 (Fig. 3) are presently journalled in antifriction bearings 232 and 234, respectively, in the same housing 230.

The differential gear units 218 and 220 being, in the present instance, alike in every respect, only one of these units, namely, the unit 218, will be described in detail. Thus, the differential gear unit 218 comprises opposite bevel-type sun gears 236 and 238 which are keyed at 240 to the aligned shafts 222 and 214, respectively. Journalled on the hubs of the sun gears 236 and 238, presently through intermediation of antifriction bearings 242 and 244, respectively, is an arm or housing 246 which with its opposite ends 248 and 250 is further journalled on the shafts 222 and 214, respectively, and in antifriction bearings 252 and 254, respectively, in the housing 230. Suitably carried by, and hence turnable with, the differential gear housing 246 are spiders 256 with stubs 258 on which are journalled, presently through intermediation of antifriction bearings 260, bevel-type planetary gears 264 which are in permanent mesh with the sun gears 236 and 238. As already mentioned, the other differential gear unit 220 is exactly like the described unit 218, and prominent parts of the former are identified in Fig. 3 by the same reference numerals as their counterparts in the latter, save that the suffix " ' " is added thereto.

Keyed at 266 and 268 to the "input" shafts 222 and 224 of the differential gear units 218 and 220 are gears 270 and 272, respectively, of the same pitch diameters which are in mesh with each other, and of which gear 270 is also in mesh with an idler gear 274 on a shaft 276 that is presently journalled in antifriction bearings 277 and 278 in the housing 230. The idler gear 274 is also in mesh with another gear 280 of the same pitch diameter as the gears 270 and 272. Gear 280 is keyed at 282 to a shaft 284 which at 286 is coupled to the main shaft 34, and is presently journalled in antifriction bearings 288 and 290 in the housing 230. It is thus obvious that the gear train, composed of the gears 280, 274, 270 and 272, drivingly connects the main shaft 34 with the input shafts 222 and 224 of the differential gear units 218 and 220, respectively, at a one-to-one ratio, and that these input shafts 222 and 224 are driven in opposite directions, with the input shaft 222 being in this instance driven in the same direction as the main shaft 34.

With the exemplary described gear train drivingly connecting the main shaft 34 with the input shafts 222 and 224 of the respective differential gear units 218 and 220, and assuming that the differential gear housings 246 and 246' are arrested against rotation by means to be described, the input shaft 222 will be driven at the same speed and in the same clockwise direction as the main shaft 34 as viewed from the right-hand end of Fig. 3, while the input shaft 224 will also be driven at the same speed but in the opposite direction. Hence, with the differential gear housings 246 and 246' arrested against rotation, as stated, the output shafts 214 and 216 of the respective differential gear units 218 and 220 will be driven in directions opposite to those in which the respective aligned input shafts 222 and 224 are driven, meaning that in the present example the output shafts 214 and 216 are driven counterclockwise and clockwise, respectively, as viewed from the right-hand end of Fig. 3. Consequently, the countershaft 110 with the inner synchronizing eccentrics 104 and 104' will be driven counterclockwise in the direction of the arrow 292 in Fig. 4, i. e., counter to the drive direction of the main shaft 34, while the explained clockwise drive of the output shaft 216 and coupled countershaft 204 will be changed to a counterclockwise drive (Fig. 4) of the outer synchronizing eccentrics 106 and 106' due to the drive-reversing action of the gear pairs 202, 198 and 202', 198' (Fig. 3). Thus, with the main shaft 34 driven in presently correct clockwise direction in view of the exemplary feed of the stock s in the direction of the arrow 112 (Fig. 4), the inner and outer synchronizing eccentrics 104—104' and 106—106', respectively, are not only driven in the same direction, and in this instance opposite to that of the main shaft 34 (Fig. 4), but are also driven at the same speed as the main shaft 34 by virtue of the described one-to-one ratio driving connection between the latter and both pairs of inner and outer synchronizing eccentrics. Thus, with the housings 246 and 246' of the respective differential gear units 218 and 220 arrested against rotation, as mentioned, the inner and outer synchronizing eccentrics of each pair are driven jointly as a unit.

In order to achieve synchronization of the shear blades 26 and 28 for any length of cut within the unit-length range, except the aforementioned certain length of cut, the synchronizing eccentrics 104—106 and 104'—106' of both pairs are relatively angularly adjustable from their described dead-center position (Fig. 4) in which they are in diametrical radius opposition to each other and impart neither oscillatory nor reciprocatory motions to their respective follower straps 100 and 102. To this end, the housings 246 and 246' of the differential gear units 218 and 220 carry worm gears 294 and 296 (Fig. 3) which are in permanent mesh with worms 298 and 300, respectively, on a shaft 302 (Fig. 8) which is presently journalled in antifriction bearings 304 and 306 in the housing 230, and in this instance coupled at 308 to another shaft 310 that is journalled in another bearing 312 in the housing 230 and coupled at 314 (Fig. 2) to the shaft 316 of an auxiliary synchronizing motor 318 of preferably reversible type for preferred power operation of the worm shaft 302 whenever synchronization of the shear is required.

It has already been mentioned that the housings 246 and 246' of the respective differential gear units 218 and 220 are normally arrested against rotation. This is, in the present instance, achieved by the self-locking action of the worms 298 and 300 on the worm gears 294 and 296 on the differential gear housings 246 and 246' when the worm shaft 302 is not driven by the auxiliary synchronizing motor 318, as will be readily understood. However, in order to accomplish synchronization of the shear to any length of cut within the unit-length range, the synchronizing eccentrics 104, 106 and 104', 106' of both pairs require relative angular adjustment, and this is achieved on turning the worm shaft 302.

For a better understanding of the action of the differential gear units 218 and 220 in the synchronization of the shear, let it be assumed that the shear is at rest and that the synchronizing eccentrics 104, 106 and 104', 106' of both pairs are in their dead-center position (Fig. 4), and that certain synchronization of the shear is to be undertaken involving relative angular adjustment of the synchronizing eccentrics of both pairs. Also, for simplified explanation of the adjustment response of the synchronizing eccentrics of both pairs to rotation of the worm shaft 302 and their subsequent effect on the shear frame 22, the response to rotation of the worm shaft of only one pair of synchronizing eccentrics, namely, the eccentrics 104 and 106, and their subsequent effect on the shear frame, will be described hereinafter, it being understood that the coordination of the synchronizing eccentrics of both pairs, their response to rotation of the worm shaft, and their subsequent effect on the shear frame, are exactly alike. Thus, with the worms 298 and 300 being, in the present example, identical and presently right-hand threaded for unidirectional drive of the worm gears 294 and 296 on rotation of the worm shaft 302, and with the shear at rest, as assumed, counterclockwise rotation, for example, of the worm shaft 302, as viewed from the right-hand end of Fig. 8, will bring about counterclockwise rotation of the worm gears 294 and 296 with their differential gear housings 246 and 246', with the result that the planetary gears 264 and 264' (Fig. 3) will turn in the same counterclockwise direction in an orbital path about the axes of the respective sun gears while rolling on the then stationary sun gears 236 and 236' respectively. In consequence, the other sun gears 238 and 238' will also be turned in the same counterclockwise direction as viewed in Fig. 3 from the right-hand end thereof. Such counterclockwise rotation of the sun gears 238 and 238' results in equal angular motions of the synchronizing eccentrics 104 and 106 from their dead-center position (Fig. 4) counterclockwise and clockwise, respectively, i. e., in opposite directions, which will be readily understood in view of the direction-reversing effect of the gears 202 and 198 upon the adjustment of the outer eccentric 106. Thus, on the described counterclockwise rotation of the worm shaft 302, the synchronizing eccentrics 104 and 106 may angularly be adjusted from their dead-center position into the relative angular disposition shown in Fig. 6, for example. In this exemplary relative angular adjustment of the synchronizing eccentrics 104 and 106 (Fig. 6), their effective throws are smaller than their radii and areas indicated at y—y, respectively, in Fig. 6, and their combined effective or resultant throw is equal to 2y, as will be readily understood. Moreover, and for advantageous reasons described hereinafter, relative angular adjustment of the synchronizing eccentrics 104 and 106 is always such that their combined effective throw places the shear frame 22 midway of the amplitude of its ensuing secondary oscillations substantially at the moments when the shear frame passes midway of the amplitude of its primary oscillations imparted to it by the operating eccentrics 46 (Fig. 6). This means that in any adjusted relative angular disposition of the synchronizing eccentrics 104 and 106, save their dead-center position, the secondary oscillations imparted by them to the shear frame 22 about the operating eccentrics 46 as a fulcrum, have their maximum modifying effect upon the primary oscillations of the shear frame about its pivot connections 96 with the eccentric follower straps 100 and 102 as a fulcrum, substantially at the moments when the blades 26 and 28 are in shearing relation with each other and with the fed stock between them, for it is at these moments that the operating eccentrics 46 and eccentric devices 88, 90 for the shear frame 22 and shear gate 24 complete the shear strokes of the blades, and the eccentrics 46, in consequence, swing the shear frame and gate midway of the amplitude of their primary oscillations (Fig. 6). Thus, with the synchronizing eccentrics 104 and 106 adjusted as shown in Fig. 6, for instance, and with the main shaft 34 being driven in the normal, presently clockwise, direction, the synchronizing eccentrics 104 and 106, being then driven jointly in the opposite or counterclockwise direction, will, at the instant of each passage of the shear frame through the momentary cutting position shown in dot-and-dash lines, swing the latter at maximum speed counterclockwise as viewed in Fig. 6 about the operating eccentrics 46 as a fulcrum, while the latter swing the shear frame at those same instants at maximum speed, also counterclockwise as viewed in Fig. 6, about its pivot connections 96 with the eccentric follower straps 100 and 102. This means that the primary and secondary oscillations imparted to the shear frame 22 by the operating eccentrics 46 and the synchronizing eccentrics 104, 106 are in this instance additive, and that the resulting oscillatory speed of the shear frame is at a maximum when the blades 26 and 28 perform a shearing action on the fed stock, and is such that the blades move then in synchronism with the fed stock, for it was for the achievement of this end result that the synchronizing eccentrics 104, 106 were adjusted into the exemplary relative angular disposition shown in Fig. 6. Accordingly, the synchronizing speed of the shear frame 22 and its following shear gate 24 is, for the exemplary relative adjustment of the synchronizing eccentrics in Fig. 6, greater than that achieved by the operating eccentrics 46 alone when these synchronizing eccentrics are in their dead-center position (Fig. 4), with the result that the present exemplary synchronization of the shear (Fig. 6) is for cutting stock in lengths which are certainly larger than those achieved when the synchronizing eccentrics are in their dead-center position.

On further adjustment of the synchronizing eccentrics 104, 106 from the relative angular disposition shown in Fig. 6, on rotation of the worm shaft 302 in the same counterclockwise direction as before, for cutting stock of even greater lengths within the unit-length range of the shear, the eccentrics 104 and 106 will be shifted from their angular positoins in Fig. 6 equal angular amounts in counterclockwise and clockwise directions, respectively, as will be readily understood, so as to increase their effective or combined throw. Thus, on relatively adjusting the synchronizing eccentrics 104, 106 in this fashion, they may finally reach the ultimate relative disposition shown in Fig. 7 in which their combined effective throw is equal to the sum of their individual radii r, and the secondary oscillatory motions imparted by them to the shear frame are of maximum amplitude and additive to the primary oscillations imparted to the shear frame by its operating eccentrics 46, meaning that in this one ultimate relative angular adjustment of the synchronizing eccentrics, the synchronization range of the shear for the possible largest length of cut has been reached.

While in any of the hereinbefore described exemplary relative angular adjustments of the synchronizing eccentrics 104, 106 from their dead-center position the synchronizing speed of the shear frame and gate is larger than that achieved by the primary oscillations alone which are imparted to the shear frame and gate by the operating eccentrics 46, it is also possible to achieve synchronizing speeds of the shear frame and gate which are smaller than that achieved by these primary oscillations alone. To this end, the synchronizing eccentrics 104 and 106 are adjusted from their dead-center position, on rotation of the worm shaft 302 in the direction opposite to that before, so that the eccentrics 104 and 106 will be turned equal angular amounts clockwise and counterclockwise, respectively, from their respective positions in Fig. 4. On thus relatively adjusting the synchronizing eccentrics 104 and 106, they will swing the shear frame and gate in directions opposite to those in which they are swung by the operating eccentrics 46 at any instant, with the result that the secondary oscillations imparted to the shear frame and gate by the synchronizing eccentrics are now subtractive from the primary oscillations imparted to them by the operating eccentrics 46, and the synchronizing speed of the shear frame and gate is, in consequence, lower than that achieved by its primary oscillations alone when the synchronizing eccentrics are in their dead-center position. Accordingly, the length of cut achieved with this exemplary relative angular adjustment of the synchronizing eccentrics is smaller than that achieved when the latter are in their dead-center position. In the other ultimate relative angular disposition of the synchronizing eccentrics 104 and 106, in which the subtractive secondary oscillations imparted by them to the shear frame and gate reach a maximum amplitude, they are relatively disposed as in Fig. 7, except that they extend with their radii $r$ to the opposite side of the axis $c$ of the shaft 110, as will be readily understood.

It follows from the preceding that the synchronization speed of the shear frame and gate may infinitely be varied on relative angular adjustment of the synchronizing eccentrics 104, 106 anywhere between the aforementioned ultimate relative angular dispositions thereof in which the synchronizing speeds are at a minimum and a maximum, respectively, and the synchronizing speed range between minimum and maximum must, of course, be sufficiently large to permit stock cuts of lengths which are infinitely variable within the unit-length range of the shear.

Reference is now had to Fig. 8A for a more comprehensive explanation of the preferred coordination of the synchronizing eccentrics 104, 106 with each other in any relative angularly adjusted disposition, and with the shear frame 22 and its operating eccentrics 46. Thus, in the full-line dead-center position of the eccentrics 104 and 106, their radii $r$ are in diametrical opposition to each other and lie in a plane $x'-x'$ with which the axes of the pivot connections 96 of the follower straps 100 and 102 with the shear frame 22 coincide, or substantially coincide, when the shear blade 26 on the shear frame is substantially at the end of its shear stroke, as shown. This is true of the pivot connections 96 in Fig. 4 also, though they are there shown slightly spaced with their axes from the same reference plane $x'-x'$ at the moment of cut for a certain reason which need not be mentioned since it does not involve the invention. The plane $x'-x'$, in which the diametrically opposed radii $r$ of the synchronizing eccentrics 104 and 106 lie, extends in this instance (Fig. 8A) also at right angles to the plane $x''-x''$ in which the radii of the frame-operating eccentrics 46 lie at the end of each shear stroke of the frame blade 26, but this is not imperative, for the shear will perform equally accurately, especially in its synchronization with the fed stock, if the planes $x'-x'$ and $x''-x''$ form a relatively large, though not necessarily a 90 degree, angle with each other at the end of each shear stroke of the frame blade 26.

On adjusting the synchronizing eccentrics 104 and 106, by the synchronizing provisions and in the manner described hereinbefore, into the respective dotted-line positions shown in Fig. 8, these eccentrics 104 and 106 will have been turned from their full-line dead-center position equal angular amounts to one and the same side of the plane $x'-x'$, with the result that the respective coordinated radii $r$ of these eccentrics now have an effective or resulting throw which is equal to $t+t$ and extends in a plane $x'''-x'''$ which itself extends at right angles to the plane $x'-x'$ even in any of the infinite momentary angular positions of the latter during the normal drive of these eccentrics. On further adjustment of the synchronizing eccentrics 104 and 106 to the nearest ultimate relative angular disposition in dot-and-dash lines, the effective or resulting throw of these eccentrics is equal to the sum of their individual radii $r$ and, moreover, extends in the same plane $x'''-x'''$. It thus follows that the effective throw of the synchronizing eccentrics 104 and 106 in any of their possible relative angular adjustments lies in the same plane $x'''-x'''$ which at all times extends at right angles to the plane $x'-x'$ in any angular position of the latter, and that the described synchronization provisions turn the synchronizing eccentrics into any of their infinite relative angular adjustments in which their high points are equally angularly spaced from the plane $x'-x'$ and lie jointly on either side of the latter, depending on whether the secondary oscillations imparted by them to the shear frame are to be additive to or subtractive from the primary oscillations imparted to the shear frame by the operating eccentrics 46. All this is achieved, of course, by the explained one-to-one ratio drive of the synchronizing eccentrics from the main shaft 34, including the differential gear units 218 and 220 and the direction-reversing gears 202, 198 and 202', 198', and the coordination in the first place of the worms 298 and 300 with the worm gears 294 and 296 so that the plane $x'-x'$, in which lie the diametrically opposed radii of the synchronizing eccentrics in their dead-center position, extends through the axes of the shear frame pivots 96, or passes them in close proximity thereto, substantially at the end of each shear stroke of the frame blade 26. In thus coordinating the elements of the synchronization provisions with each other and with the shear frame 22 and its operating eccentrics 46, the shear frame, and hence also the shear gate, will to all practical intents and purposes assume the same favorable angular position at the time of any cut, regardless of the relative angular adjustment of the synchronizing eccentrics in any of their infinite relative dispositions. Thus, with the shear frame 22 in Fig. 8A being shown in the exemplary most favorable full-line angular position at the time of cut, with the frame blade 26 then extending at right angles, or nearly so, to the guided fed stock $s$, when the synchronizing eccentrics are in their dead-center position, the shear frame will, on relative adjustment of the synchronizing eccentrics to the one ultimate dot-and-dash line relative position, be at the time of each cut in the dot-and-dash line position shown which hardly deviates from its full-line position, and in any event not sufficiently to have any adverse effect upon the stock-cutting performance of the shear blades.

While the hereinbefore described exemplary synchronizations of the shear have been undertaken while the latter was assumed to be at rest, it is, of course, among the important advantages of the present shear that synchronization may be undertaken while the same is in operation. Thus, while the shear is in operation, rotation imparted to the sun gears 238 and 238', as a result of rotation of the worm shaft 302 and ensuing orbital motion of the planetary gears 264 and 264', is simply superimposed upon the normal drive of these sun gears 238 and 238', with the result that the relative adjustment of the synchronizing eccentrics thus achieved is exactly like that achieved if the worm shaft had been turned in the same direction and through the same angular distance while the shear was at rest. To assist in properly synchronizing the shear to any desired length of cut within the unit-length range, recourse may be had to a rotary dial or disc 330 on a bracket 332 on top of the housing 230 (Figs. 1 and 2). This disc is through suitable reduction gearing 334 and a chain drive 336 driven from the motor-driven shaft 310, and bears suitable graduations to indicate with reference to a fixed pointed 338 the synchronization of the shear for any particular length of cut.

The instant shear 20 is, like that shown in my aforementioned prior Patent No. 2,642,937, also capable of cutting stock in lengths which are certain multiples of any length within the unit-length range of the shear. This is achieved by certain miss-cut actions of the blade 28 on the shear gate 24, to the end that this blade will move into shearing relation with the frame blade 26 and the stock $s$ between them only on certain recurring numbers of shear strokes of the frame blade 26. Thus, the operating eccentrics 92 and 94 are not locked to each other and to the main shaft 34 as previously assumed, but are individually driven and turnable relative to each other and to the main shaft 34. To this end, the spaced inner operating eccentrics 92 are provided on a sleeve 342 (Fig. 3) which is turnable on the main shaft 34 and has keyed thereto at 344 a gear 346. The outer operating eccentrics 94, which are turnable on the respective inner operating eccentrics 92, carry crank pins 348 with guide blocks 350 which are slidable in radial grooves 352 in end flanges 354 on sleeves 356, respectively, which are turnable on the eccentric sleeve 342 on opposite sides of the gear 346 thereon, and presently also journalled in a housing 347 (Figs. 1 to 3). The eccentric sleeves 356 are provided with gears 358, respectively.

The earlier described shaft 120, besides being coupled with the main shaft 34 for its drive (Fig. 5), constitutes the input shaft of a miss-cut gear unit 360, having also two output shafts 362 and 364. Keyed to the input shaft 120 is an axially slidable main drive gear 366 which may be coupled with either of two opposite gears 368 and 370 that turn freely on the shaft 120. The main drive gear 366 meshes with a gear 372 which is freely turnable on the output shaft 362 and axially slidable thereon into and from coupling relation with a gear 374 that is keyed to the same shaft 362. Another gear 376 is keyed to the output shaft 362 on one side of the gear 374, while still another gear 378 is keyed to the same output shaft 362 on the opposite side of the gear 372. Gear 378 is in mesh with a freely turnable gear 380 on the other output shaft 364. The gear 380 may be drivingly connected with the output shaft 364 on sliding a splined coupling member 382 on the latter into coupling relation with gear 380. Another loose gear 384 on the output shaft 364, which is in mesh with the gear 376, may also be drivingly connected with the output shaft 364 on sliding the splined coupling member 382 thereon into coupling relation with gear 384.

The variable-speed output shafts 362 and 364 of the miss-cut gear unit 360 are adapted for the drive of the inner and outer operating eccentrics 92 and 94, respectively. To this end, there is coupled at 386 to the output shaft 362 a shaft 388 which carries a gear 390 that meshes with the gear 346 on the sleeve 342 on which the inner operating eccentrics 92 are provided (see also Fig. 3). Coupled at 392 to the other output shaft 364 is a shaft 394 which carries gears 396 (Fig. 5) that are drivingly connected, through intermediation of loose idler gears 398 on the shaft 388, with the gears 358 on the respective sleeves 356 which are operatively connected with the outer operating eccentrics 94 (see also Fig. 3).

Following the example given in my prior Patent No. 2,642,937, the particular gear ratios of the miss-cut change gears of the described unit 360 may have been selected for producing no miss-cuts, one miss-cut, three successive miss-cuts, or seven successive miss-cuts. Thus, in order to cut stock in lengths anywhere within the unit-length range, i. e., without any miss-cut action of the blades 26 and 28, the gate blade 28 must complete its full shear stroke at the completion of each shear stroke of the frame blade 26. This is achieved, while the shear is at rest, by shifting the main gear 366 into coupling engagement with the gear 370 on the input shaft 120 of the miss-cut gear unit 360 (Fig. 5), whereby gear 370 will become drivingly connected with the input shaft 120 for the drive of the gears 378 and 380. Gear 378, which is fast on the output shaft 362, thus becomes drivingly connected with the gear 390 and, hence, also with the gear 346 on the inner eccentric sleeve 342 (see also Fig. 3). The coupling member 382 is also shifted into coupling engagement with gear 380 on the other output shaft 364, thereby establishing a driving connection between gear 380 and the gears 358 on the outer eccentric sleeve 356 via output shaft 364, and gears 396 and 398. In thus setting the miss-cut gear unit 360, the inner and outer gate-operating eccentrics 92 and 94, in their full radius-complementing relation shown in Fig. 4, will be driven at the same speed and in the same direction as the frame-operating eccentrics 46 (Fig. 4), with the result that the blades 26 and 28 simultaneously complete each full shear stroke. In order to double any length of cut within the unit-length range, one miss-cut action of the blades 26 and 28 is resorted to. This is achieved, in the present example, by setting the miss-cut gear unit 360 (Fig. 5) so as to achieve the drive of the gear 346 on the inner eccentric sleeve 342 from the input shaft 120 via the main gear 366, gears 372 and 374, output shaft 362 and connected shaft 388, and gear 390, and to achieve the drive of the gears 358 on the outer eccentric sleeves 356 from the input shaft 120 via main gear 366, gears 372 and 374, output shaft 362, gears 378 and 380, coupling member 382, the other output shaft 364 and connected shaft 394, and gears 396 and 398. In thus setting the miss-cut gear unit 360, the inner and outer gate-operating eccentrics 92 and 94 will in their full radius-complementing relation be driven jointly in the same direction as the frame-operating eccentrics 46, but at one and one-half times the speed of the latter, with the result that the gate blade 28 completes a full shear stroke only on completion of each second or alternate shear stroke of the frame blade 26. In order to quadruple any length of cut within the unit-length range, the miss-cut gear unit is, in the present example, set so as to achieve the drive of the gear 346 on the inner eccentric sleeve 342 from the input shaft 120 via the main gear 366, gears 372 and 374, output shaft 362 and connected shaft 388, and gear 390, and to achieve the drive of the gears 358 on the outer eccentric sleeves 356 from the input shaft 120 via main gear 366, gears 372 and 374, output shaft 362, gears 376 and 384, coupling member 382, the other output shaft 364 and connected shaft 394, and gears 396 and 398. In thus setting the miss-cut gear unit 360, the gate-operating eccentrics 92, 94 will be driven to complete a full shear stroke of the gate blade 28 on the completion of each fourth shear stroke of the frame blade 26, meaning that the gate blade 28 has three successive miss-cut actions between consecutive cutting actions.

Since the miss-cut action of the shear does not have any bearing on the present invention and is, moreover, fully described in my aforementioned prior Patent No. 2,642,937, it is not deemed necessary to comment further on this miss-cut action. Of course, any miss-cut action of the shear does not interfere with the hereinbefore described synchronization of the same, for the synchronization is undertaken on the shear frame 22, and the shear gate 24 will be synchronized with the shear frame 22 at the time of all successive cuts and regardless of any number of miss-cut actions of the gate blade 28 therebetween, as will be readily understood.

It is now evident that the described shear 20 achieves all the aforementioned objectives. The same important objectives, save that of permitting synchronization of the shear while the same is in operation, are achieved by the modified synchronizing device 400 shown in Figs. 9 and 10. This device comprises dual eccentrics 402 and 404 of which the inner eccentric 402 is angularly adjustable on a shaft 406, presently through intermediation of a collet-like sleeve 408 having an end flange 410 to receive bolts 412 with which to draw the sleeve 408 into and from clamping relation with the shaft 406 and eccentric 402. The outer eccentric 404 is angularly adjustable on the inner eccentric 402, presently through intermediation of another collet-like sleeve 414 having an end flange 416 to receive bolts 418 with which to draw the sleeve 414 into and from clamping relation with the eccentrics 402 and 404. The shaft 406 may be considered to be driven from the main shaft of a shear at a one-to-one ratio and in the same or opposite direction as that of the main shaft. The outer eccentric 404 receives a follower strap 420 which is pivotally connected with the shear frame in the same or similar manner in which the follower strap 100 is connected with the shear frame 22 in Fig. 4. The eccentrics 402 and 404 have identical radii, and are shown in Fig. 9 relatively adjusted in diametrical radius opposition to each other, or in dead-center position, in which they impart neither oscillatory motion nor reciprocatory motion to the connected shear frame. As shown in Fig. 9, the eccentrics 402 and 404 lie with their diametrically opposed radii in a plane $x''''$—$x''''$. So coordinated with this plane $x''''$—$x''''$ as to lie therein when the eccentrics 402 and 404 are in their illustrated dead-center position, are zero markers of graduations 422 and 424 on the adjacent faces of the eccentrics 402 and 404, respectively. Evidently, these graduations 422 and 424 are greatly helpful in adjusting the respective eccentrics 402 and 404 equal angular amounts from their dead-center position jointly to either side of the plane $x''''$—$x''''$, for synchronization of the shear to any length of cut within its unit-length range in accordance with the principles explained hereinbefore in connection with the shear 20. Also, in order to retain the shear frame at the times of cut in a most favorable angular position regardless of the relative adjustment of the synchronizing eccentrics 402 and 404, the follower strap 420 may be provided with a reference mark 426 which, if aligned with the zero markers of the graduations 422 and 424 on the respective eccentrics 402 and 404 as shown, indicates that the axis of the pivot connection of the follower strap 420 with the shear frame lies in, or in close proximity to, the plane $x''''$—$x''''$ when the shear blades are substantially at the ends of their shear strokes. Used for the same purposes, together with the reference mark 426 on the follower strap 420 or in lieu thereof, may be a reference mark or notch 428 in the shaft 406.

While in the described shear 20 the shear gate 24 with its blade 28 reciprocates in timed relation with the shear frame 22 and its blade 16, the shear gate and its blade, while necessarily oscillating with the shear frame, need not reciprocate but may, instead, be linked with the main shaft, without in any way affecting the featured synchronization of the shear. Also, while in the described shear 20 the secondary oscillations from the synchronizing eccentrics are imparted directly to the shear frame, this is not imperative, for the same satisfactory synchronization may be achieved by imparting the secondary oscillations to the shear gate which, in turn, will transmit them to the shear frame for superimposition upon the primary oscillations of the latter from its operating eccentrics. Thus, Fig. 11 shows a modified shear 430 in which the shear frame 432 turns with its spaced legs 434 on operating eccentrics 436 on a main drive shaft 438, while the shear gate 440 is turnable on the main shaft 438 and carries pivots 442 which project into guide slots 444 in the opposite frame legs 434. The shear gate 440 is thus floatingly pivotally connected with the shear frame 432, to permit reciprocation of the latter and its blade 446 relative to the shear gate 440 and its blade 448 for recurring shearing actions of the blades on fed stock $s$ between them, and to compel the shear gate to participate in the synchronized motion of the shear frame at the times of cut. To this end, the longitudinal axes of the guide slots 444 in the shear frame legs 434 lie in a plane coincident with, or parallel to, the plane in which the radii of the frame-operating eccentrics 436 lie at the time of each cut, for it is under these conditions that the blades 446 and 448 are brought into shearing relation with each other and with the stock between them while the blades extend at right angles, or substantially at right angles, to the guided stock for most efficient shearing of the latter.

The instant modified shear 430 may also be equipped with two identical pairs of synchronizing eccentrics (not shown) which may be relatively adjustable and driven in the same manner as the synchronizing eccentrics of the previously described shear 20. The synchronizing eccentrics of the instant modified shear have follower straps 450 which are pivotally connected, not directly with the shear frame as in the described shear 20, but instead with the shear gate 440. This is, in the present example, achieved by connecting the follower straps 450 with the pivots 442 on the shear gate which, through their floating connections with the shear frame 432, transmit to the latter the secondary oscillations from the synchronizing eccentrics, as will be readily understood.

Finally, while the featured synchronization of the present invention has hereinbefore been demonstrated on flying shears for cutting stock in motion, all the advantages of this featured synchronization are secured if tools other than shear blades, such as a punch and die, for example, are to perform on stock in motion. Thus, Fig. 12 shows a modified apparatus 460 which is adapted to score continuously fed stock $s$ at recurring intervals, for instance. To this end, the swing frame 462, which carries a scoring tool 464, is turnably mounted on an operating eccentric 466 on a main drive shaft 468, while its lower end is pivotally connected at 470 with a follower strap 472 on synchronizing eccentrics (not shown) which may be relatively adjustable and driven in the same manner as the synchronizing eccentrics of the previously described shear 20. The instant apparatus 460 is also devoid of a gate and, instead, has a counter roll 474 which is turnable on a fixed shaft 476. This is fully adequate for proper scoring performance of the tool 464 on the stock between any successive lengths thereof within the length range of the apparatus, for the featured synchronization of the latter is such that the swing frame will hardly deviate from the illustrated scoring position regardless of the stock length between scores thereon.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In apparatus of the kind described, the combination with operating eccentric means, and a frame carrying a tool and being turnable on said eccentric means so as to reciprocate said tool into and from recurring operating relation with fed stock on the drive of said eccentric means relative to said frame, of two synchronizing eccentrics of which an inner one is turnable about a fixed axis and an outer one is turnable on said inner eccentric; a follower strap on said outer eccentric pivotally connected with said frame remote from said eccentric means; means for independently angularly adjusting said synchronizing eccentrics into different dispositions relative to each other and to said operating eccentric means; and means for driving said synchronizing eccentrics jointly in any of said relative dispositions in time relation with said operating eccentric means, whereby superimposed oscillatory motions imparted to said frame by said synchronizing eccentrics result in synchronized motion of said tool with the fed stock at its recurring operations thereon at different relative feeding and driving speeds of the stock and operating eccentric means, respectively, on adjustment of said synchronizing eccentrics into correspondingly different relative dispositions.

2. In apparatus of the kind described, the combination with a drive shaft having an operating eccentric, and a frame carrying a tool and being turnable on said eccentric so as to reciprocate said tool and bring it substantially at the end of each work stroke thereof into operating relation with fed stock on the drive of said shaft relative to said frame, of two other eccentrics of equal radii of which an inner one is turnable about a fixed axis and an outer one is turnable on said inner eccentric; a follower strap on said outer eccentric pivotally connected with said frame remote from said shaft; means for independently angularly adjusting said other eccentrics into different dispositions relative to each other and to said operating eccentric; and means for driving said other eccentrics jointly in any of said relative dispositions in timed relation with said shaft at a one-to-one ratio, whereby superimposed first and second oscillatory motions imparted to said frame by said operating eccentric and said other eccentrics, respectively, result in synchronized motion of said tool with the fed stock at its recurring operations thereon at different relative feeding and driving speeds of the stock and shaft, respectively, on adjustment of said other eccentrics in correspondingly different relative dispositions, including one in which they are in diametrical radius opposition to each other so that said second oscillatory motions are zero.

3. The combination in apparatus as set forth in claim 2, further comprising indicating provisions, including graduations on said other eccentrics, for assisting in planned relative adjustment of the latter so that they lie with their diametrically opposed radii in said one relative disposition in a plane with which the axis of said pivot connection is substantially coincident when said tool is substantially at the end of its work stroke, and are adjustable from said one relative disposition equal angular amounts to the same side of said plane.

4. The combination in apparatus as set forth in claim 2, further comprising indicating provisions, including graduations on said other eccentrics, for assisting in planned relative adjustment of the latter so that they lie with their diametrically opposed radii in said one relative disposition in a plane with which the axis of said pivot connection is substantially coincident when said tool is substantially at the end of its work stroke, and are adjustable from said one relative disposition equal angular amounts jointly to either side of said plane.

5. The combination in apparatus as set forth in claim 2, further comprising indicating provisions, including graduations on said other eccentrics, for assisting in planned relative adjustment of the latter so that they lie with their diametricaly opposed radii in said one relative disposition in a plane which extends substantially at right angles to the reciprocatory direction of said tool when the latter is substantially at the end of its work stroke, and are adjustable from said one relative disposition equal angular amounts jointly to either side of said plane, and the axis of said pivot connection is substantially coincident with said plane when said tool is substantially at the end of its work stroke.

6. In apparatus of the kind described, the combination with a drive shaft having an operating eccentric, and a frame carrying a tool and being turnable on said eccentric so as to reciprocate said tool and bring it substantially at the end of each work stroke thereof into operating relation with fed stock on the drive of said shaft relative to said frame, of two other eccentrics of equal radii of which an inner one is turnable about a fixed axis and an outer one is turnable on said inner eccentric; a follower strap on said outer eccentric pivotally connected with said frame remote from said shaft; means, having a first drive section associated with said shaft and continuing drive sections associated with said other eccentrics, respectively, and angularly adjustable relative to said first drive section, for jointly driving said other eccentrics from said shaft at a one-to-one ratio; and means for jointly angularly adjusting said continuing drive sections relative to said first drive section to cause angular adjustments of said other eccentrics into one relative disposition in which they lie with their diametrically opposed radii in a plane with which the axis of said pivot connection is substantially coincident when said tool is substantially at the end of its work stroke, and into other relative dispositions in which they are spaced from said one relative disposition equal angular amounts jointly to either side of said plane, whereby superimposed first and second oscillatory motions imparted to said frame by said operating eccentric and said other eccentrics, respectively, result in synchronized motion of said tool with the fed stock at its recurring operations thereon at different relative feeding and driving speeds of the stock and shaft, respectively, on corresponding adjustment of said other eccentrics in said relative dispositions, including said one relative disposition in which said second oscillatory motions are zero.

7. The combination in apparatus as set forth in claim 6, in which said plane extends substantially at right angles to the reciprocatory direction of said tool when the latter is substantially at the end of its work stroke.

8. The combination in apparatus as set forth in claim 6, in which said continuing drive sections include differential gears, respectively, each having a rotary arm carrying a planetary gear, and said adjusting means comprise a driving connection between said arms, and means for turning one of said arms, thereby permitting adjustment of said other eccentrics while said shaft is driven.

9. The combination in apparatus as set forth in claim 6, in which said continuing drive sections include differential gears, respectively, each having a rotary arm carrying a planetary gear, and said adjusting means comprise worm gears on said arms, respectively, and a turnable shaft carrying self-locking worms in mesh with said worm gears, respectively, thereby permitting adjustment of said other eccentrics while said drive shaft is driven.

10. In apparatus of the kind described, the combination with a drive shaft having an operating eccentric, and frame and gate members carrying first and second companion tools, respectively, of which said frame member is turnable on said eccentric and said gate member is linked with said shaft and guided on said frame member so as to reciprocate said first tool and bring it substantially at the end of each work stroke thereof into operating relation with the other tool and with fed stock between them on the drive of said shaft relative to said frame member, of two other eccentrics of which an inner one is turnable about a fixed axis and an outer one is turnable on said inner eccentric; a follower strap on said outer eccentric pivotally connected with one of said members remote from said shaft; means for independently angularly adjusting said other eccentrics into different dispositions relative to each other and to said operating eccentric; and means for driving said other eccentrics jointly in any of said relatives dispositions from said shaft at a one-to-one ratio, whereby superimposed oscillatory motions imparted to said member by said eccentrics result in synchronized motion of said tools with the fed stock at their recurring operations thereon at different relative feeding and driving speeds of the stock and shaft, respectively, on adjustment of said other eccentrics into correspondingly different relative dispositions.

11. In apparatus of the kind described, the combination with a drive shaft having an operating eccentric, and frame and gate members carrying first and second companion tools, respectively, of which said frame member is turnable on said eccentric and said gate member is linked with said shaft and guided on said frame member so as to reciprocate said first tool and bring it substantially at the end of each work stroke thereof into operating relation with the other tool and with fed stock between them on the drive of said shaft relative to said frame member, of two other eccentrics of equal radii of which an inner one is turnable about a fixed axis and an outer one is turnable on said inner eccentric; a follower strap on said outer eccentric pivotally connected with one of said members remote from said shaft; means for independently angularly adjusting said other eccentrics into different dispositions relative to each other and to said operating eccentric; and means for driving said other eccentrics jointly in any of said relative dispositions from said shaft at a one-to-one ratio, whereby superimposed first and second oscillatory motions imparted to said members by said operating eccentric and said other eccentrics, respectively, result in synchronized motion of said tools with the fed stock at their recurring operations thereon at different relative feeding and driving speeds of the stock and shaft, respectively, on adjustment of said other eccentrics in correspondingly different relative dispositions, including one in which they are in diametrical radius opposition to each other so that said second oscillatory motions are zero.

12. The combination in apparatus as set forth in claim 11, further comprising indicating provisions, including graduations on said other eccentrics, for assisting in planned relative adjustment of the latter so that they lie with their diametrically oposed radii in said one relative disposition in a plane with which the axis of said pivot connection is substantially coincident when said first tool is substantially at the end of its work stroke, and are adjustable from said one relative disposition equal angular amounts jointly to either side of said plane.

13. The combination in apparatus as set forth in claim 11, further comprising indicating provisions, including graduations on said other eccentrics, for assisting in planned relative adjustment of the latter so that they lie with their diametrically opposed radii in said one relative disposition in a plane which extends substantially at right angles to the reciprocating direction of said first tool when the latter is substantially at the end of its work stroke, and are adjustable from said one relative disposition equal angular amounts jointly to either side of said plane, and the axis of said pivot connection is substantially coincident with said plane when said first tool is substantially at the end of its work stroke.

14. In apparatus of the kind described, the combination with a drive shaft having an operating eccentric, and frame and gate members carrying first and second companion tools, respectively, of which said frame member is turnable on said eccentric and said gate member is linked with said shaft and guided on said frame member so as to reciprocate said first tool and bring it substantially at the end of each work stroke thereof into operating relation with the other tool and with fed stock between them on the drive of said shaft relative to said frame member, of two other eccentrics of equal radii of which an inner one is turnable about a fixed axis and an outer one is turnable on said inner eccentric; a follower strap on said outer eccentric pivotally connected with one of said members remote from said shaft; means, having a first drive section associated with said shaft and continuing drive sections associated with said other eccentrics, respectively, and angularly adjustable relative to said first drive section, for jointly driving said other eccentrics from said shaft at a one-to-one ratio; and means for jointly angularly adjusting said continuing drive sections relative to said first drive section to cause angular adjustments of said other eccentrics into one relative disposition in which they lie with their diametrically opposed radii in a plane with which the axis of said pivot connection is substantially coincident when said first tool is substantially at the end of its work stroke, and into other relative dispositions in which they are spaced from said one relative disposition equal angular amounts jointly to either side of said plane, whereby superimposed first and second oscillatory motions imparted to said members by said operating eccentric and said other eccentrics, respectively, result in synchronized motion of said tools with the fed stock at their recurring operations thereon at different relative feeding and driving speeds of the stock and shaft, respectively, on corresponding adjustment of said other eccentrics in said relative dispositions, including said one relative disposition in which said second oscillatory motions are zero.

15. The combination in apparatus as set forth in claim 14, in which said continuing drive sections include differential gears, respectively, each having a rotary arm carrying a planetary gear, and said adjusting means comprise a driving connection between said arms, and means for turning one of said arms, thereby permitting adjustment of said other eccentrics while said shaft is driven.

16. The combination in apparatus as set forth in claim 14, in which said continuing drive sections include differential gears, respectively, each having a rotary arm carrying a planetary gear, and said adjusting means comprise worm gears on said arms, respectively, and a turnable shaft carrying self-locking worms in mesh with said worm gears, respectively, thereby permitting adjustment of said other eccentrics while said drive shaft is driven.

17. In apparatus of the kind described, the combination with a drive shaft having operating eccentrics, and frame and gate members carrying companion tools, respectively, of which said frame member is turnable on one of said eccentrics and said gate member is operatively connected with the other eccentric and guided on said frame member so that said tools reciprocate in a first plane and move substantially at the ends of their work strokes into recurring operating relation with each other and with fed stock between them on the drive of said shaft relative to said members, of two other eccentrics of equal radii of which an inner one is turnable about a fixed axis and an outer one is turnable on said inner eccentric; a follower strap on said outer eccentric pivotally connected with one of said members remote from said shaft; means, having a first drive section associated with said shaft and continuing drive sections associated with said other eccentrics, respectively, and angularly adjustable relative to said first drive section, for jointly driving said other eccentrics from said shaft at a one-to-one ratio; and means for jointly angularly adjusting said continuing drive sections relative to said first drive section to cause angular adjustments of said other eccentrics into one relative disposition in which they lie with their diametrically opposed radii in a second plane with which the axis of said pivot connection substantially coincides when said tools are substantially at the ends of their work strokes, and into other relative dispositions in which they are spaced from said one relative disposition equal angular amounts jointly to either side of said second plane, whereby superimposed first and second oscillatory motions imparted to said members by the operating eccentric of said one member and by said other eccentrics, respectively, result in synchronized motion of said tools with the fed stock at their recurring operations thereon at different relative feeding and driving speeds of the stock and shaft, respectively, on corresponding adjustment of said other eccentrics in said relative dispositions, including said one relative disposition in which said second oscillatory motions are zero.

18. The combination in apparatus as set forth in claim 17, in which said second plane extends substantially at right angles to said first plane when said tools are substantially at the ends of their work strokes.

19. The combination in apparatus as set forth in claim 17, in which said continuing drive sections include differential gears, respectively, each having a rotary arm carrying a planetary gear, and said adjusting means comprise a driving connection between said arms, and means for turning one of said arms, thereby permitting adjustment of said other eccentrics while said shaft is driven.

20. The combination in apparatus as set forth in claim 17, in which said continuing drive sections include differential gears, respectively, each having a rotary arm carrying a planetary gear, and said adjusting means comprise worm gears on said arms, respectively, and a turnable shaft carrying self-locking worms in mesh with said worm gears, respectively, thereby permitting adjustment of said other eccentrics while said drive shaft is driven.

21. In a flying shear, the combination with a drive shaft having first and second operating eccentrics, and a frame and a gate carrying companion shear blades, respectively, of which said frame is turnable on said first eccentric and said gate is operatively connected with said second eccentric and guided on said frame so that said blades reciprocate in a first plane and move substantially at the ends of their work strokes into recurring shearing relation with each other and with fed stock between them on the drive of said shaft relative to said frame and gate, of two other eccentrics of equal radii of which an inner one is carried by a countershaft parallel to said drive shaft and an outer one is turnable on said inner eccentric; a follower strap on said outer eccentric pivotally connected with said frame remote from said drive shaft; two differential gear units, each having first and second sun gears and a rotatable arm with a planetary gear intermediate of and in mesh with said sun gears, of which said second sun gear of one of said units is turnable with said countershaft; a gear train drivingly connecting said drive shaft with said first sun gear of said one unit so that said inner eccentric is driven in a certain direction from said drive shaft at a one-to-one ratio when the arm of said one unit is arrested against rotation; a driving connection between said first sun gear of said one unit and said outer eccentric, including the other unit, for driving said outer eccentric in the same direction and at the same speed as said inner eccentric when the arm of said other unit is arrested against rotation; worm gears on the arms of said units, respectively; and a turnable shaft carrying self-locking worms in mesh with said worm gears, respectively, for relatively angularly adjusting said other eccentrics on turning said worm shaft in either direction, said worms and worm gears are so coordinated with each other and with said other eccentrics that the latter lie with their diametrically opposed radii in one of their relative adjusted dispositions in a second plane with which the axis of said pivot connection substantially coincides when said blades are substantially at the ends of their work strokes, and are in all other relative adjusted dispositions spaced from said one relative adjusted disposition equal angular amounts jointly to either side of said second plane, whereby superimposed first and second oscillatory motions imparted to said frame and gate by said first and said other eccentrics, respectively, result in synchronized motion of said blades with the fed stock at their recurring shearing operations thereon at different relative feeding and driving speeds of the stock and drive shaft, respectively, on corresponding adjustment of said other eccentrics into said relative dispositions, including said one relative disposition in which said second oscillatory motions are zero.

22. The combination in a flying shear as set forth in claim 21, in which said driving connection further includes two identical meshing gears turning with said first sun gears of said units, respectively, a disc freely turnable on said countershaft and having a radial groove, two further identical meshing gears turning with said second sun gear of said other unit and with said disc, respectively, and a crank pin carried by said outer eccentric and slidably received in the groove of said disc, said worms and worm gears being identical for turning said arms in the same directions on turning said worm shaft.

23. In apparatus of the kind described, the combination with operating eccentric means, and a frame carrying a tool and being turnable on said eccentric means so as to reciprocate said tool into and from recurring operating relation with fed stock on the drive of said eccentric means relative to said frame, of two synchronizing eccentrics of which an inner one is turnable about a fixed axis and an outer one is turnable on said inner eccentric; a follower strap on said outer eccentric pivotally connected with said frame remote from said eccentric means; means having a first drive section associated with said eccentric means and continuing drive sections associated with said synchronizing eccentrics, respectively, for jointly driving the latter in timed relation with said eccentric means, said continuing drive sections including differential gears, respectively, each having a rotary arm carrying a planetary gear; and means for turning said arms to cause angular adjustments of said synchronizing eccentrics into different dispositions relative to each other and to said eccentric means, so that superimposed first and second oscillatory motions imparted to said frame by said eccentric means and synchronizing eccentrics, respectively, result in synchronized motion of said tool with the fed stock at its recurring operations thereon at different relative feeding and driving speeds of the stock and eccentric means, respectively, on adjustment of said synchronizing eccentrics into correspondingly different relative dispositions.

References Cited in the file of this patent

UNITED STATES PATENTS

| | | |
|---|---|---|
| 2,043,684 | Walter | June 9, 1936 |
| 2,144,308 | Hallden | Jan. 17, 1939 |
| 2,261,007 | Talbot | Oct. 28, 1941 |
| 2,642,937 | Hallden | June 23, 1953 |
| 2,653,662 | Biggert | Sept. 29, 1953 |
| 2,734,570 | Hallden | Feb. 14, 1956 |